(12) United States Patent
Cho (10) Patent No.: US 9,076,084 B2
(45) Date of Patent: Jul. 7, 2015

(54) IMAGE FORMING APPARATUS HAVING A DEFAULT MODE AND METHOD OF OPERATING THE IMAGE FORMING APPARATUS

(75) Inventor: Tae-gyun Cho, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 224 days.

(21) Appl. No.: 13/565,004

(22) Filed: Aug. 2, 2012

(65) Prior Publication Data

US 2013/0088735 A1   Apr. 11, 2013

(30) Foreign Application Priority Data

Oct. 7, 2011   (KR) ........................ 10-2011-0102627

(51) Int. Cl.
| | | |
|---|---|---|
| *G06F 3/12* | (2006.01) | |
| *G06K 15/00* | (2006.01) | |
| *G06F 9/44* | (2006.01) | |
| *G03G 15/00* | (2006.01) | |
| *H04N 1/00* | (2006.01) | |
| *G06F 9/445* | (2006.01) | |
| *G06F 15/00* | (2006.01) | |

(52) U.S. Cl.
CPC ............ *G06K 15/005* (2013.01); *G06F 9/4443* (2013.01); *G03G 15/502* (2013.01); *H04N 1/00411* (2013.01); *H04N 1/00424* (2013.01); *H04N 1/00432* (2013.01); *H04N 1/00474* (2013.01); *H04N 1/00482* (2013.01); *H04N 1/00517* (2013.01); *H04N 2201/0094* (2013.01); *G06F 9/44505* (2013.01)

(58) Field of Classification Search
CPC .......... H04N 1/00411; H04N 1/00424; H04N 1/00432; H04N 1/00474; H04N 1/00482; H04N 2201/0094; G06G 15/502; G06G 9/44505; G06G 9/4443; G06K 15/005
USPC ............... 358/1.1, 1.9, 1.13, 1.14, 1.15, 1.18, 358/426.03, 539; 382/232, 235, 276, 303, 382/304

See application file for complete search history.

(56) References Cited

U.S. PATENT DOCUMENTS

| | | | |
|---|---|---|---|
| 7,458,014 B1 * | 11/2008 | Rubin et al. | 715/229 |
| 8,375,327 B2 * | 2/2013 | Lorch et al. | 715/810 |
| 2002/0180786 A1 * | 12/2002 | Tanner | 345/745 |
| 2012/0218589 A1 * | 8/2012 | Watanabe et al. | 358/1.15 |

* cited by examiner

*Primary Examiner* — Gabriel Garcia
(74) *Attorney, Agent, or Firm* — Staas & Halsey LLP (57) ABSTRACT

An image forming apparatus includes a user interface unit to display a user interface window to receive a user command, a job management unit to perform a job corresponding to the user command, a storage unit to store a plurality of user interface windows and UI information on a user interface window to be displayed at a pre-set point of time among the plurality of user interface windows, and a control unit to control the user interface unit so as to update the UI information stored in the storage unit based on the user command received with respect to the job and display a user interface window corresponding to the updated UI information at the pre-set point of time.

17 Claims, 8 Drawing Sheets

IMAGE FORMING APPARATUS HAVING A DEFAULT MODE AND METHOD OF OPERATING THE IMAGE FORMING APPARATUS

CROSS-REFERENCE TO RELATED APPLICATIONS

This application claims the benefit under 35 U.S.C. §119 from Korean Patent Application No. 10-2011-0102627, filed on Oct. 7, 2011, in the Korean Intellectual Property Office, the disclosure of which is incorporated herein by reference in its entirety.

BACKGROUND OF THE INVENTION

1. Field of the Invention

The present general inventive concept relates to an image forming apparatus, a method of operation the image forming apparatus, and a recording medium, and more particularly, to an image forming apparatus which changes automatically a default mode according to a user environment and displays the same, a method of operating the image forming apparatus, and a recording medium.

2. Description of the Related Art

In general, an image forming apparatus refers to an apparatus that prints printing data generated in a terminal apparatus such as a computer on recording paper. Examples of such an image forming apparatus are copiers, printers, facsimile machines, or multifunction peripherals (MFPs) complexly realizing the functions of the aforementioned devices in a single device.

MFPs provide various functions including copying, faxing, scanning and the like, and provide usually a software function button in the case of a hardware button or GUI (Graphical User Interface) as a button to start the above functions.

As described above, it is usually required to press a button for a relevant function of the MFP so as to start one of the functions provided by the MFP such as copying, faxing, scanning and the like. In order to provide a solution to this inconvenience, most MFPs select one of the functions from the main functions such as copying, faxing, scanning and the like, designate the selected function as a default mode, move the pre-designated default mode to the beginning of operation of the MFP or in a case of not being used by a user for more than a certain time period, and enable the next user to start immediately to work without moving a relevant function.

Meanwhile, the above default mode is set mostly by a system administrator, and if the default mode set by the system administrator is not appropriate to a real environment, the function set as a default mode, which is performed in order to improve usability, may instead cause inconvenience to the user. In other words, although the default mode is set properly at the beginning, i.e., by a system administrator, when a frequently used function is changed according to changes in environment such as a user's work patterns or user changes, the function previously set as a default mode function may cause inconvenience to present users.

SUMMARY OF THE INVENTION

The present general inventive concept provides a solution to the above-mentioned problems, and also provides an automatic setting function of a default mode so that the default mode may be automatically changed according to a user's environments and displayed.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus including: a user interface unit to display a user interface window to receive a user command, a job management unit to perform a job corresponding to the user command, a storage unit to store a plurality of user interface windows and UI information on a user interface window to be displayed at a pre-set point of time among the plurality of user interface windows, and a control unit to control the user interface unit so as to update the UI information stored in the storage unit based on the user command received with respect to the job and display a user interface window corresponding to the updated UI information at the pre-set point of time.

The pre-set point of time may be from a moment that the user command is input until a pre-set time passes, or that the image forming apparatus is powered on.

Further, the control unit can update the UI information based on a user interface window corresponding to a job used at the end in the image forming apparatus.

Also, the control unit can update the UI information based on a user interface window corresponding to the most frequently used job in the image forming apparatus during a pre-set period of time.

Further, the user interface unit displays a user interface window to select a UI display mode of the image forming apparatus, the control unit updates the UI information according to the selected UI display mode, and the UI display mode may comprise a fixed mode which displays a fixed user interface window at the pre-set point of time and an automatic mode which changes the user interface window displayed at the pre-set point of time to correspond to a user command received with respect to a job, and displays the same.

The user interface window to select the UI display mode may comprise a first area to select a plurality of fixed modes concerning a job supportable by the image forming apparatus and a second area to select the automatic mode.

Further, if the storage unit is initialized, the user interface unit can be controlled so that a user interface window of a home mode may be displayed.

The foregoing and/or other features and utilities of the present general inventive concept may also be achieved by providing a method of operating an image forming apparatus, the method including: updating a pre-stored UI information based on a user command received with respect to a job, displaying a user interface window corresponding to the updated UI information at a pre-set point of time, receiving a user command on the displayed user interface window, and carrying out a job corresponding to the received user command, and the UI information may be information on a user interface window to be displayed at a pre-set point of time among a plurality of user interface windows.

The pre-set point of time may be from a moment that the user command is input until a pre-set time passes, or when the image forming apparatus is powered on.

Further, the updating can update the UI information based on a user interface window corresponding to a job used at the end in the image forming apparatus.

Also, the updating can update the UI information based on a user interface window corresponding to the most frequently used job in the image forming apparatus during a pre-set period of time.

The method may further include displaying a user interface window to select a UI display mode of the image forming apparatus, and the updating updates the UI information according to the selected UI display mode, and the UI display mode may comprise a fixed mode which displays a fixed user interface window at the pre-set point of time and an automatic mode which changes the user interface window displayed at the pre-set point of time to correspond to a user command received with respect to a job and displays the same.

The user interface window to select the UI display mode may comprise a first area to select a plurality of fixed modes concerning a job supportable from the image forming apparatus and a second area to select the automatic mode.

Further, the displaying can display a user interface window of a home mode if the storage unit is initialized.

The foregoing and/or other features and utilities of the present general inventive concept may also be achieved by providing a non-transient computer readable recording medium which stores a program code to perform a method of operating an image forming apparatus, the method including: updating a pre-stored UI information based on a user command received with respect to a job, displaying a user interface window corresponding to the updated UI information at a pre-set point of time, receiving a user command on the displayed user interface window, and carrying out a job corresponding to the received user command, and the UI information may be information on a user interface window to be displayed at a pre-set point of time among a plurality of user interface windows.

The foregoing and/or other features and utilities of the present general inventive concept may also be achieved by providing a control system to control a multi-functional peripheral device (MFP), comprising: a user interface unit to display a user interface window to receive a command; a storage unit to store a plurality of user interface windows and UI information on a user interface window to be displayed at a pre-set point of time among the plurality of user interface windows; and a control unit to update UI information stored in the storage unit based on a user command received with respect to a job to be performed by the MFP and to control the user interface unit to display a user interface window corresponding to the updated UI information at the pre-set point of time.

In an embodiment, the control system may further include a job management unit to manage the MFP to perform a job corresponding to the user command received at the user interface unit.

In an embodiment, the pre-set point of time may be a moment that the user command is input and the pre-set time passes, or that the MFP is powered on.

In an embodiment, the control unit updates the UI information based on a user interface window corresponding to a job recently used in the MFP.

In an embodiment, the control unit updates the UI information based on a user interface window corresponding to a job which is most frequently used in the MFP during a pre-set period of time.

In an embodiment, the user interface unit displays a user interface window so that UI display mode is selected for the MFP, wherein the control unit updates the UI information according to the selected UI display mode, and wherein the UI display mode comprises a fixed mode displaying a fixed user interface window at the pre-set point of time and an automatic mode changing and displaying a user interface window displayed at the pre-set point of time in response to a user command input with respect to a job to be performed by the MFP.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Before providing a detailed description, it is to be noted that a default mode is defined as a mode which is displayed as a user interface window designated at a point of time that a user command is input and a pre-set time passes, or displayed when an image forming apparatus is powered on in the detailed description.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
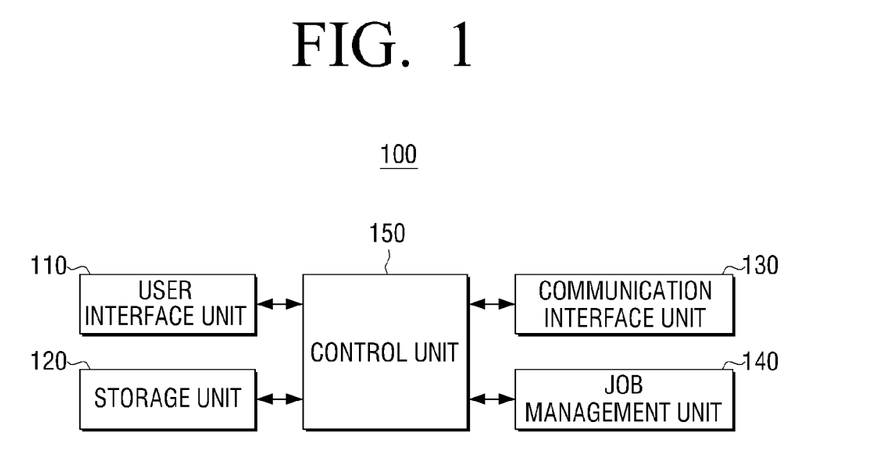
FIG. 1 is a block diagram illustrating an image forming apparatus according to an exemplary embodiment.

FIG. 1 is a block diagram illustrating an image forming apparatus or multi-functional peripheral (MFP) device according to an exemplary embodiment. Referring to FIG. 1, an image forming apparatus 100 may include a user interface unit 110, a storage unit 120, a communication interface unit 130, a job management unit 140, and a control unit 150. Alternatively, a control system including the user interface unit 110, storage unit 120, communication interface unit 130, job management unit 140, and control unit 150 may be separate from and connected to the MFP via a wired or wireless connection.

The user interface unit 110 enables a user to set or select various functions supported by the image forming apparatus 100.

Specifically, the user interface unit 110 can display a user interface window to receive user commands. In other words, a user may input a copying command, a faxing command, a scanning command, a document box command (a command to display data stored in the storage unit 120 of the image forming apparatus 100), a scan to USB command (a command to transmit a manuscript read by a scanning unit to USB), a scan to cloud command (a command to transmit a manuscript read by a scanning unit to cloud), a scan to box command (a command to store a manuscript read by a scanning unit in the storage unit 120 of the image forming apparatus 100), a box to cloud command (a command to transmit data stored in the storage unit 120 of the image forming apparatus 100 to cloud), and the like through the user interface unit 110. The functions will not be confined to the above, and more various functions can be offered according to the types of functions supported by the image forming apparatus 100.

Further, the user interface unit 110 may display a user interface window to select a UI display mode in the image forming apparatus 100. The UI display mode indicates whether a default mode is a fixed mode or an automatic mode.

In other words, the fixed mode may be a mode which displays a fixed user interface window at a pre-set point of time. For example, if a user selects a fixed mode as a default mode in a user interface window and sets a user interface window to perform a copying function to be displayed at a pre-set point of time, the user interface unit 110 can display a user interface window to perform a copying function at a pre-set point of time by a control of the control unit 150.

If the user selects an automatic mode as a default mode in the user interface window and sets a condition to display a user interface window corresponding to a final job used as a method of changing the default mode, the user interface unit 110 can display a user interface window corresponding to the final job used at a pre-set point of time by a control of the control unit 150.

Herein, the user interface window to select the UI display mode may comprise a first area to select a plurality of fixed modes concerning a job supportable by the image forming apparatus 100 and a second area to select the automatic mode.

Herein, the user interface unit 110 may be realized by a device implementing an input and output simultaneously, such as a touch pad, or may be realized by combining an input device including a mouse or a keyboard with a display device including a CRT monitor, LCD monitor, or LED.

The user interface window to select the above UI display mode may be provided to system administrators or general users, but a user interface window to select the above UI display mode may be provided only to the system administrators. In other words, it will be desirable to offer a UI display mode so that each private owner can set a default mode in a private image forming apparatus. However, in case where several users use a shared image forming apparatus, such as in the case of the image forming apparatus being used in a business-type environment, a problem may arise when each user is provided with a user interface window to select a UI display mode since a default mode setting is likely to vary depending on the individual tendency of the users with respect to using the image forming apparatus. Therefore, in this case, the UI display mode can be provided only to the system administrators, and to this end account information is requested only from the system administrators.

The storage unit 120 stores various programs and data which are necessary to drive the image forming apparatus 100.

Specifically, the storage unit 120 may store a plurality of user interface windows.

Further, the storage unit 120 may store UI information for a user interface window to be displayed at a pre-set point of time among the plurality of user interface windows. In other words, the storage unit 120 can store UI information for a user interface window to be displayed at a point of time to display a default mode among the plurality of user interface windows (for example: if a home command is input by a user, the image forming apparatus 100 displays a home menu which is a top-level menu and the storage unit 120 can store a user interface window corresponding to the home menu; if a copying command is input by a user, the image forming apparatus 100 displays a user interface window to carry out the copying command and the storage unit 120 can store the user interface window to carry out the copying command; and if a faxing command is input by a user, the image forming apparatus 100 displays a user interface window to carry out the faxing command and the storage unit 120 can store the user interface window to carry out the faxing command).

Further, the storage unit 120 can store information on whether a job is performed last in the image forming apparatus 100 and a job count for each job performed in the image forming apparatus 100. In other words, the storage unit 120 can store data as given in the table below. Namely, if an automatic mode is set in a UI display mode through the user interface unit 110, the control unit 150 can determine what the job performed last is on the basis of the table below and how many count for each job is performed in a pre-set section, and update UI information stored in the storage unit 120.

TABLE 1

| Job types | Job count | Job performed last |
|---|---|---|
| Copy | 10 | No |
| Fax | 5 | Yes |
| Scan | 1 | No |

Herein, the storage unit 120 can be embodied as embedded storage elements specifically including RAM (Random Access Memory), ROM (Read Only Memory), EPROM (Erasable Programmable ROM), EEPROM (Electronically Erasable and Programmable ROM), register, hard disk, removable disk, memory card, and the like, and also as removable storage elements such as USB memory and the like.

The communication interface unit 130 connects the image forming apparatus 100 to an external device (e.g., host device).

Herein, the communication interface unit 130 can be connected by using a wired or wireless network method through a LAN (Local Area Network) and an internet network and also by a USB (Universal Serial Bus) port.

The job management unit 140 processes jobs such as printing, scanning, copying, faxing, and the like by a control signal of the control unit 150. Specifically, if a copying command is input by a user, the job management unit 140 can read a manuscript through a scanning unit by the control of the control unit 150 and print the read manuscript on paper or other recording medium through a printing unit so as to process the job of the copying command.

The control unit 150 controls overall functions of the image forming apparatus 100.

Specifically, the control unit 150 may update UI information stored in the storage unit 120 based on a user command received with respect to a job. The UI information refers to information on a user interface window to be displayed at a pre-set point of time.

In other words, the control unit 150 may update UI information stored in the storage unit 120 based on a user interface window corresponding to a final job performed in the image forming apparatus 100 among user commands input with respect to jobs. For example, if the final job performed by a user is a copying function, the control unit 150 can update the UI information to a user interface window to perform the copying function.

Further, the control unit 150 can update UI information based on a user interface window corresponding to a job which is most frequently performed during a pre-set period of time in the image forming apparatus 100 among user commands input with respect to jobs. For instance, if a copying function is most frequently performed by a user during the pre-set period of time, the control unit 150 can update the UI information to a user interface window to perform the copying function.

This is not limited thereto, and all methods which are considered to be necessary to change a default mode according to user environments can be used.

Further, the control unit 150 can control the user interface unit 110 so as to display a user interface window corresponding to UI information updated at a pre-set point of time.

Herein, the pre-set point of time may be a moment at which the image forming apparatus 100 needs an operation to be performed in a default mode, for example, from a moment that the user command is input to when the pre-set time passes, or when the image forming apparatus 100 is powered on. In other words, even though the user command is input and the pre-set time passes, there may be an inconvenience in performing other functions in the case that a user interface window corresponding to the input command is maintained. Further, if a default mode is not displayed at the point that the image forming apparatus 100 is powered on, there may be inconvenience to a user who frequently performs a copying function. Therefore, the point of time when an operation is required in a default mode can be set as described above. However, the above point of time is not limited thereto, and may be set in various manners according to user environments.

Namely, the control unit 150 can control the user interface unit 110 so as to display a user interface window corresponding to UI information updated by the above described method at the point of time considered that an operation is necessary in a default mode.

Further, the control unit 150 can update UI information according to chosen UI display modes. As described above, the UI display mode indicates whether a default mode is a fixed mode or an automatic mode.

In other words, if the default mode is a fixed mode, the control unit 150 controls the user interface unit 110 to display a pre-set user interface window at a point of time that an operation is required in a default mode, and thus may not update UI information.

However, if the default mode is an automatic mode, the control unit 150 updates a user interface window corresponding to a final job which is performed so as to display the user interface window corresponding to the final job performed in the image forming apparatus 100 at a point of time considered that an operation is required in a default mode, and thus may update UI information.

Further, if the default mode is an automatic mode, the control unit 150 updates a user interface window corresponding to a job which is most frequently used so as to display the user interface window corresponding to the job which is most frequently used in the image forming apparatus 100 during a pre-set period of time at a point of time considered that an operation is required in a default mode, and thus may update UI information.

Further, if a job corresponding to a user command input through the user interface unit 110 is carried out, the control unit 150 can update a final job performed in the storage unit 120 and the number of times being performed. In other words, the control unit 150 can update the final job performed in the storage unit 120 and the number of times being performed to update UI information stored in the storage unit 120 based on a user command input with respect to a job.

Further, if the storage unit 120 is initialized, the control unit 150 can control the user interface unit 110 to display a user interface window of a home mode. Namely, if the storage unit 120 is initialized and no information is involved, a home mode which displays various functions performed in the image forming apparatus 100 is displayed to a user, which results in providing convenience to the user.

Figure 2:
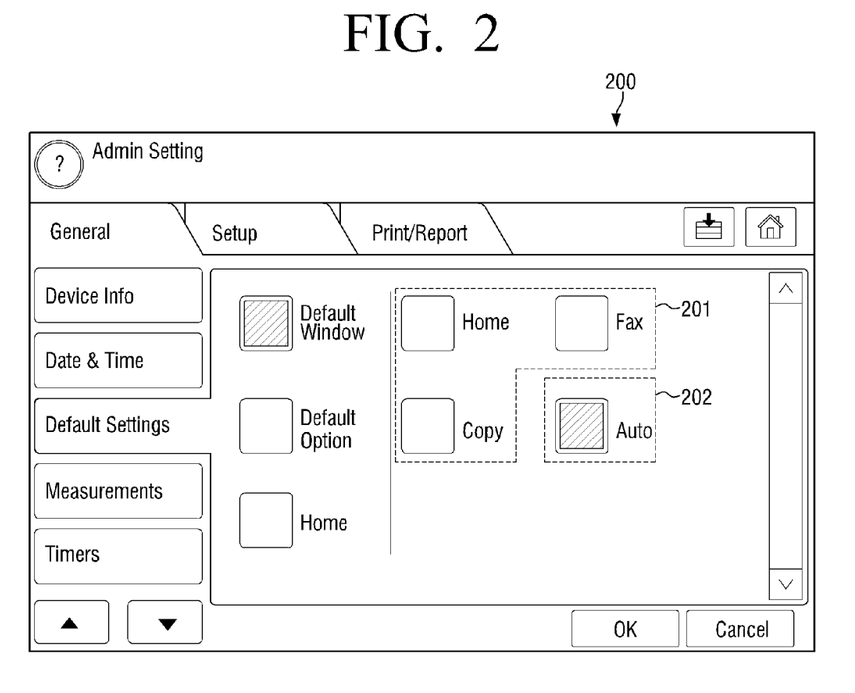
FIGS. 2 and 3 are views illustrating a user interface window to select a UI display mode.
Figure 3:
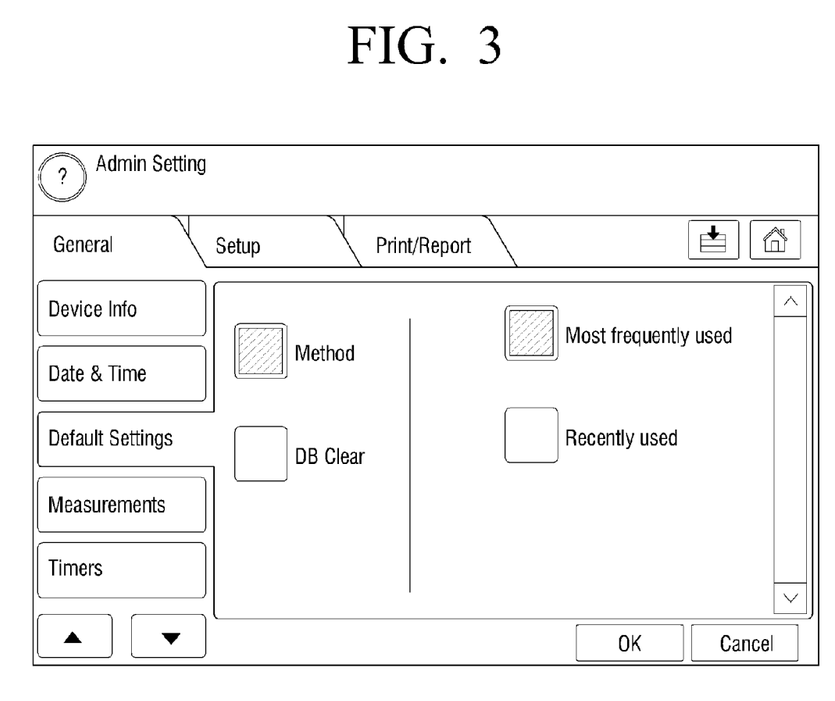

FIGS. 2 and 3 are views illustrating a user interface window to select a UI display mode.

Referring to FIG. 2, the user interface window 200 to select the UI display mode may comprise a first area to select a plurality of fixed modes concerning a job supportable by the image forming apparatus and a second area to select the automatic mode.

In other words, FIG. 2 includes HOME, COPY, and FAX options as a plurality of fixed modes concerning a job supportable by the image forming apparatus. Herein, if a user selects the FAX option, the control unit 150 can control the user interface unit 110 so as to display a user interface window to perform the fax function at a point of time considered that an operation is required in a default mode.

If the user selects the second area 202 to select an automatic mode, namely AUTO, the control unit 150 can control the user interface unit 110 to display a user interface window as shown in FIG. 3.

FIG. 3 is a view illustrating by what method a default mode is changed automatically at a point of time considered that an operation is necessary in a default mode when an automatic mode is selected in a UI display mode.

In other words, if the "Recently used" mode is selected by a user, the control unit 150 can update UI information stored in the storage unit 120 based on a user interface window corresponding to a final job used in the image forming apparatus 100 among user commands input with respect to jobs. For example, if a copying function is the final function performed by the user, the control unit 150 can update UI information to a user interface window operable to carry out the copying function.

Further, if the "Most frequently used" mode is selected by a user, the control unit 150 can update UI information based on a user interface window corresponding to a job which is most frequently used in the image forming apparatus 100 during a pre-set period of time among user commands input with respect to jobs. For example, if a copying function is the most frequently used job by the user during the pre-set period of time, the control unit 150 can update UI information to a user interface window operable to carry out the copying function.

Figure 4:
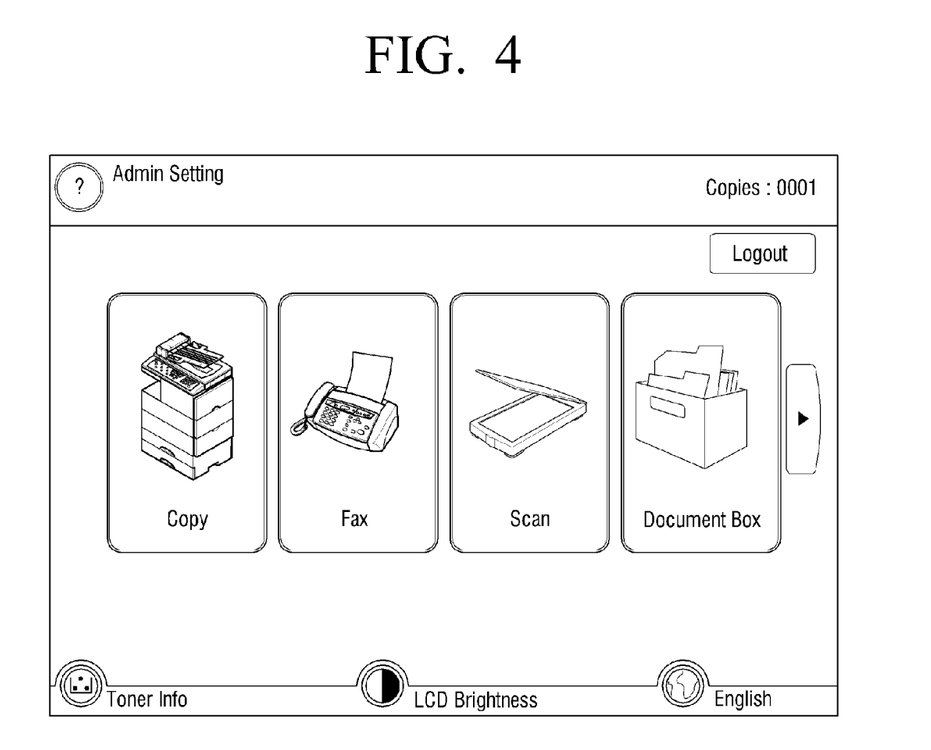
FIGS. 4 to 6 are views illustrating a user interface window displayed as an automatic mode is set.
Figure 5:
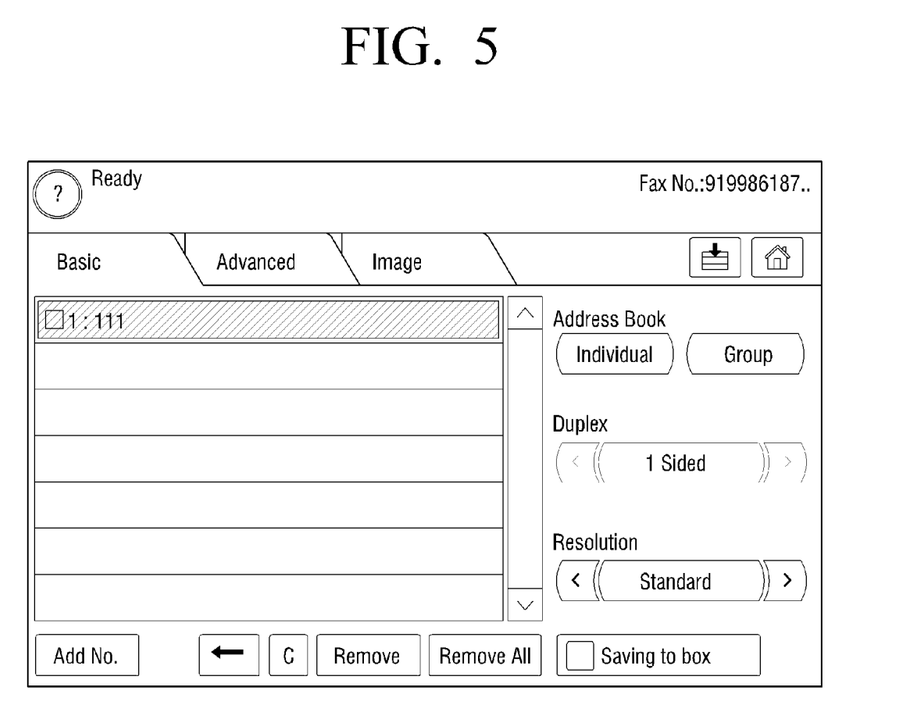
Figure 6:
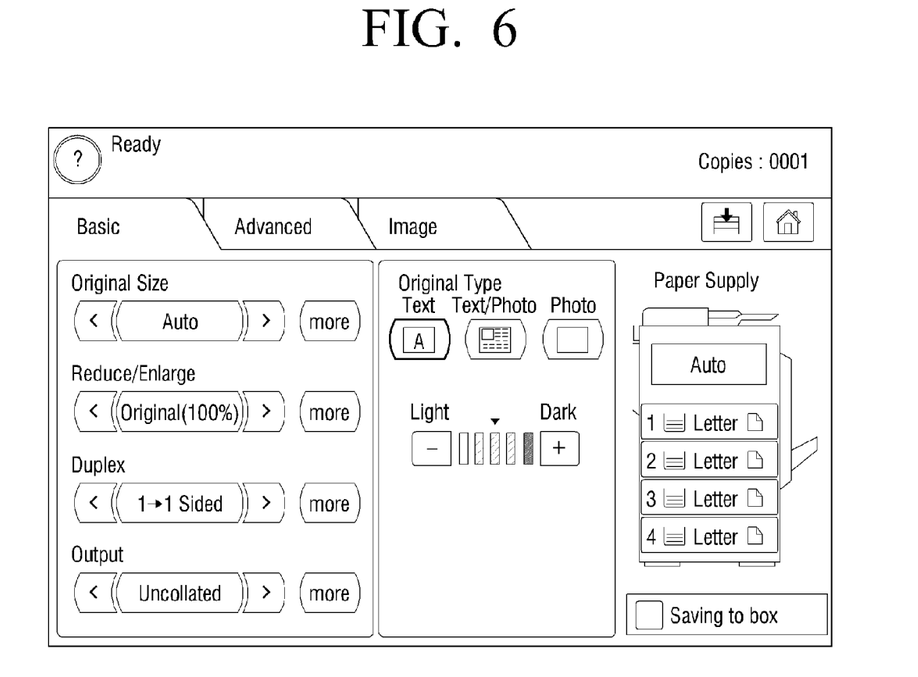

FIGS. 4 to 6 are views illustrating a user interface window displayed as an automatic mode is set.

First, an initial user interface window is assumed to be a home user interface window as shown in FIG. 4.

A method of an automatic change in default mode input by a user refers to a change method of displaying a user interface window corresponding to a final job used in the image forming apparatus 100. If a faxing job is the final job used by the user, the control unit 150 can update UI information to a user interface window to perform the faxing function, and if an operation is determined to be necessary in a default mode, the control unit 150 can display a default screen as the user interface window to perform the faxing function as shown in FIG. 5. Thereafter, if a copying job is carried out by the user, the control unit 150 can update UI information to a user interface window to perform the copying function, and if an operation is determined to be necessary in a default mode, the control unit 150 can display a default screen as the user interface window to perform the copying function as shown in FIG. 6.

A method of an automatic change in default mode selected by a user refers to a change method of displaying a user interface window corresponding to a job which is most frequently used in the image forming apparatus 100 during a pre-set period of time. If a faxing job is most frequently used by the user during the pre-set period of time, the control unit 150 can update UI information to a user interface window to perform the faxing function, and if an operation is determined to be necessary in a default mode, the control unit 150 can display a default screen as the user interface window to perform the faxing function as shown in FIG. 5. Thereafter, if a copying job is most frequently carried out by the user during the pre-set period of time, the control unit 150 can update UI information to a user interface window to perform the copying function, and if an operation is determined to be necessary in a default mode, the control unit 150 can display a default screen as the user interface window to perform the copying function as shown in FIG. 6.

Figure 7:
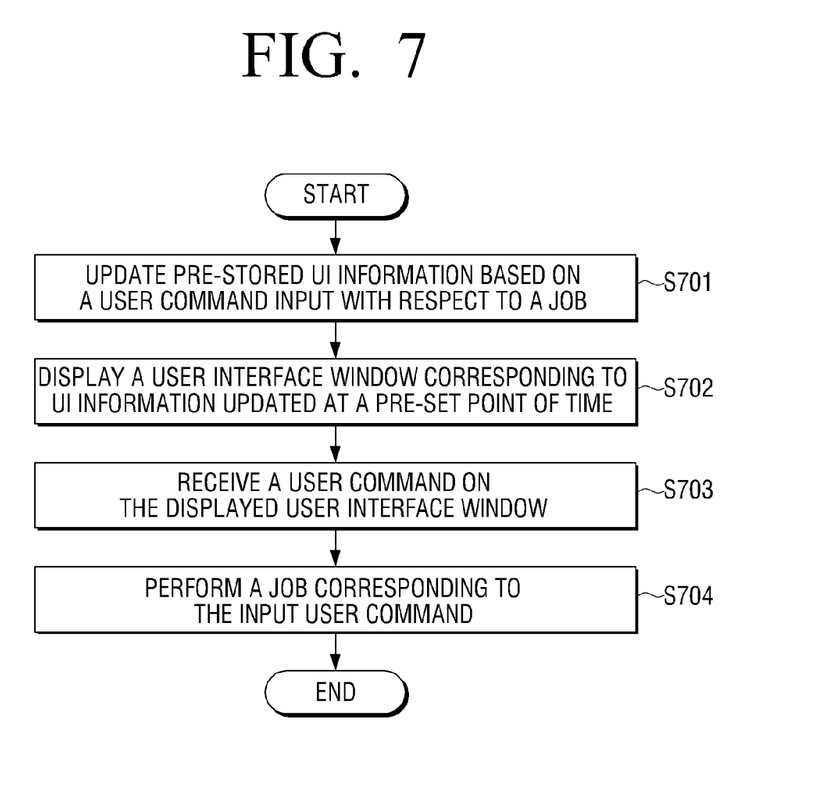
FIG. 7 is a flowchart illustrating a method of operating an image according to an exemplary embodiment.

FIG. 7 is a flowchart illustrating a method of operating an image according to an exemplary embodiment. Referring to FIG. 7, pre-stored UI information is updated based on user commands input with respect to jobs (S701). In other words, pre-stored UI information can be updated based on a user interface window corresponding to a final job used in the image forming apparatus 100 among the user commands input with respect to jobs. Further, pre-stored UI information can be updated based on a user interface window corresponding to a job which is most frequently used in the image forming apparatus 100 during a pre-set period of time among the user commands input with respect to jobs.

Thereafter, a user interface window corresponding to UI information updated at a pre-set point of time is displayed (S702). Thereafter, a user command is input on the displayed user interface window (S703). Thereafter, a job corresponding to the input user command is performed (S704).

Figure 8:
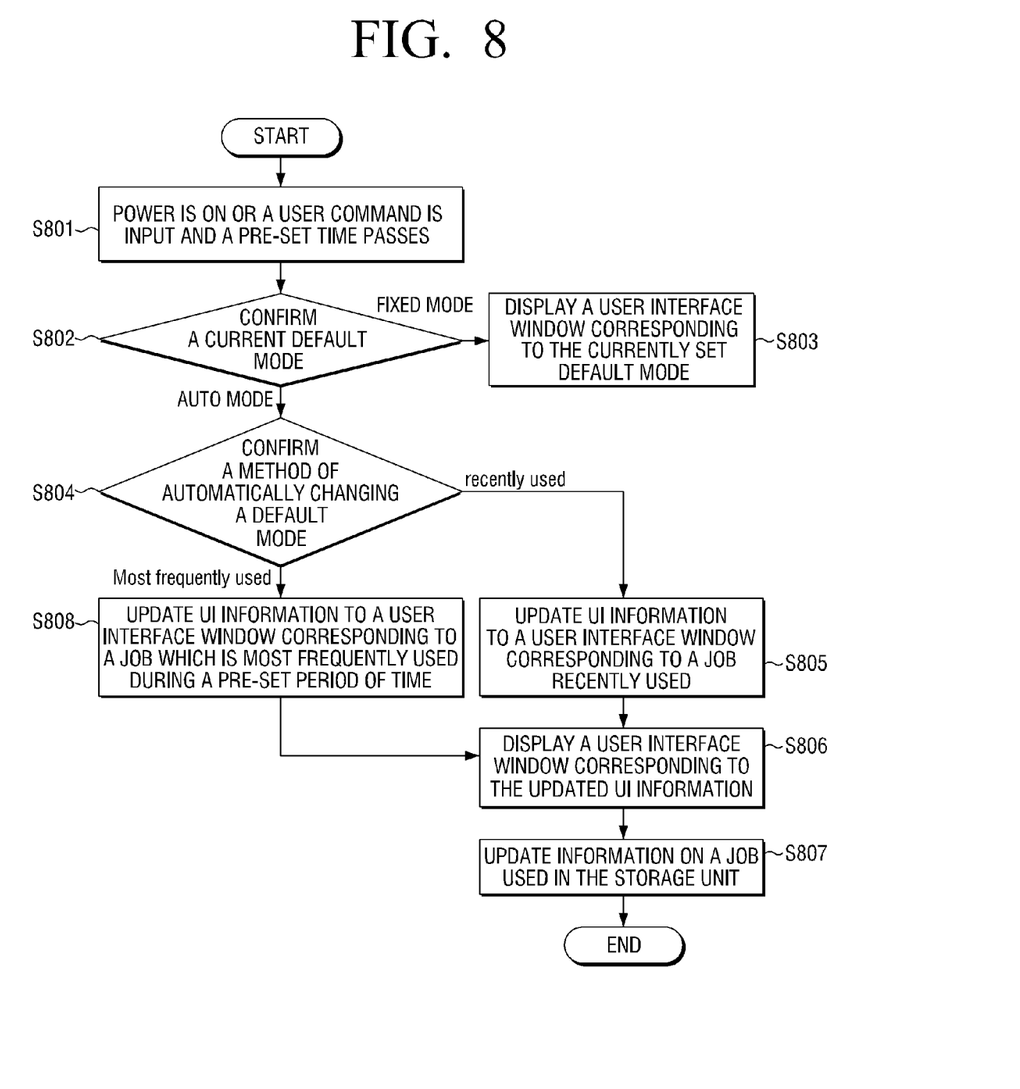
FIG. 8 is a flowchart illustrating a method of changing automatically a default mode according to an exemplary embodiment.

FIG. 8 is a flowchart illustrating a method of changing automatically a default mode according to an exemplary embodiment. Referring to FIG. 8, when a user command is input and a pre-set time passes, or when the image forming apparatus is powered on (S801), a current default mode is confirmed (S802).

If the current default mode is a fixed mode (S802; Fixed mode), a user interface window corresponding to the currently set default mode is displayed (S803). In other words, if the default mode is a copying mode, the user interface window is displayed as a copying user interface window.

If the current default mode is an automatic mode (S802; Auto mode), a method of an automatic change in the current default mode is confirmed (S804). When the current method is a final job used in the image forming apparatus (S804; Recently used), UI information is updated to a user interface window corresponding to the most recently used job (S805). Thereafter, a user interface window corresponding to the updated UI information is displayed (S806). Thereafter, information on a job used in the storage unit is updated (S807).

If the current default mode is an automatic mode (S802; Auto mode), a current method is confirmed (S804). When the current method is a job which is most frequently used during a pre-set period of time (S804; Most frequently used), UI information is updated to a user interface window corresponding to the most frequently used job during the pre-set period of time (S808). Thereafter, a user interface window corresponding to the updated UI information is displayed (S806). Thereafter, information on a job used in the storage unit is updated (S807).

Meanwhile, according to the exemplary embodiments described above, the method of operating the image forming apparatus can be embodied as program codes and stored in a variety of recording media, and specifically the various types of recording media is readable in a terminal, including RAM (Random Access Memory), flash memory, ROM (Read Only Memory), EPROM (Erasable Programmable ROM), EEPROM (Electronically Erasable and Programmable ROM), register, hard disk, removable disk, memory card, USB memory, CD-ROM, and the like.

Accordingly, in order to execute the method of forming an image in devices connected to the recording media or equipped therewith, a program can be installed.

According to the exemplary embodiments described above, since an automatic setting function is provided for a default mode and the default mode is automatically changed and displayed according to user environments, convenience in which the existing techniques intended to offer is provided, and thus time inconvenience may be resolved, which is caused by changes of the user environments.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a user interface unit to display a user interface window to receive a user command;
   a job management unit to perform a job corresponding to the user command;
   a storage unit to store a plurality of user interface windows and UI information on a user interface window to be displayed at a pre-set point of time among the plurality of user interface windows; and
   a control unit to update the UI information stored in the storage unit based on a user command input with respect to the job and control the user interface unit to display a user interface window corresponding to the updated UI information at the pre-set point of time,
   wherein the plurality of user interface windows includes at least one of a user interface window to carry out a copying command, a user interface window to carry out a faxing command, a user interface window to carry out a scanning command, and a user interface window to carry out a printing command,
   wherein the user interface unit displays a user interface window so that UI display mode is selected in the image forming apparatus,
   wherein the control unit updates the UI information according to the selected UI display mode, and
   wherein the UI display mode comprises a fixed mode displaying a fixed user interface window at the pre-set point of time and an automatic mode changing and displaying a user interface window displayed at the pre-set point of time in response to a user command input with respect to a job.

2. The image forming apparatus as claimed in claim 1, wherein the pre-set point of time is a moment that the user command is input and the pre-set time passes, or that the image forming apparatus is powered on.

3. The image forming apparatus as claimed in claim 1, wherein the control unit updates the UI information based on a user interface window corresponding to a job recently used in the image forming apparatus.

4. The image forming apparatus as claimed in claim 1, wherein the control unit updates the UI information based on a user interface window corresponding to a job which is most frequently used in the image forming apparatus during the pre-set period of time.

5. The image forming apparatus as claimed in claim 1, wherein the user interface window to select the UI display mode comprises a first area to select a plurality of fixed modes concerning jobs supportable from the image forming apparatus and a second area to select the automatic mode.

6. The image forming apparatus as claimed in claim 1, wherein when the storage unit is initialized, the control unit controls the user interface unit so as to display a user interface window of a home mode.

7. A method of operating an image forming apparatus, the method comprising:
   updating pre-stored UI information based on a user command input with respect to a job;
   displaying a user interface window corresponding to the updated UI information at a pre-set point of time;
   receiving a user command on the displayed user interface window;
   performing a job corresponding to the input user command; and
   displaying a user interface window to select UI display mode of the image forming apparatus,
   wherein the UI information is information on a user interface window to be displayed at a pre-set point of time among a plurality of user interface windows,
wherein the plurality of user interface windows includes at least one of a user interface window to carry out a copying command, a user interface window to carry out a faxing command, a user interface window to carry out a scanning command, and a user interface window to carry out a printing command,
   wherein the updating updates the UI information according to the selected UI display mode, and
   wherein the UI display mode comprises a fixed mode displaying a fixed user interface window at the pre-set point of time and an automatic mode changing and displaying a user interface window displayed at the pre-set point of time in response to a user command input with respect to a job.

8. The method as claimed in claim 7, wherein the pre-set point of time is a moment that the user command is input and the pre-set time passes, or that the image forming apparatus is powered on.

9. The method as claimed in claim 7, wherein the updating updates the UI information based on a user interface window corresponding to a job recently used in the image forming apparatus.

10. The method as claimed in claim 7, wherein the updating updates the UI information based on a user interface window corresponding to a job which is most frequently used in the image forming apparatus during a pre-set period of time.

11. The method as claimed in claim 7, wherein the user interface window to select the UI display mode comprises a first area to select a plurality of fixed modes concerning jobs supportable from the image forming apparatus and a second area to select the automatic mode.

12. The method as claimed in claim 7, wherein when a storage unit is initialized, the displaying displays a user interface window of a home mode.

13. A non-transient computer readable recording medium storing thereon a program code to execute a method of forming an image of an image forming apparatus, the method comprising:
   updating pre-stored UI information based on a user command input with respect to a job;
   displaying a user interface window corresponding to the updated UI information at a pre-set point of time;
   receiving a user command on the displayed user interface window;
   performing a job corresponding to the input user command; and
   displaying a user interface window to select UI display mode of the image forming apparatus,
   wherein the UI information is information on a user interface window to be displayed at a pre-set point of time among a plurality of user interface windows,
   wherein the plurality of user interface windows includes at least one of a user interface window to carry out a copying command, a user interface window to carry out a faxing command, a user interface window to carry out a scanning command, and a user interface window to carry out a printing command,
   wherein the updating updates the UI information according to the selected UI display mode, and
   wherein the UI display mode comprises a fixed mode displaying a fixed user interface window at the pre-set point of time and an automatic mode changing and displaying a user interface window displayed at the pre-set point of time in response to a user command input with respect to a job.

14. A control system to control a multi-functional peripheral device (MFP), comprising:
   a user interface unit to display a user interface window to receive a command;
   a storage unit to store a plurality of user interface windows and UI information on a user interface window to be displayed at a pre-set point of time among the plurality of user interface windows; and
   a control unit to update UI information stored in the storage unit based on a user command received with respect to a job to be performed by the MFP and to control the user interface unit to display a user interface window corresponding to the updated UI information at the pre-set point of time,
   wherein the plurality of user interface windows includes at least one of a user interface window to carry out a copying command, a user interface window to carry out a faxing command, a user interface window to carry out a scanning command, and a user interface window to carry out a printing command,
   wherein the user interface unit displays a user interface window so that UI display mode is selected for the MFP,
   wherein the control unit updates the UI information according to the selected UI display mode, and
   wherein the UI display mode comprises a fixed mode displaying a fixed user interface window at the pre-set point of time and an automatic mode changing and displaying a user interface window displayed at the pre-set point of time in response to a user command input with respect to a job to be performed by the MFP.

15. The control system as claimed in claim 14, further comprising:
   a job management unit to manage the MFP to perform a job corresponding to the user command received at the user interface unit.

16. The control system as claimed in claim 14, wherein the pre-set point of time is a moment that the user command is input and the pre-set time passes, or that the MFP is powered on.

17. The control system as claimed in claim 14, wherein the control unit updates the UI information based on a user interface window corresponding to a job recently used in the MFP or a job which is most frequently used in the MFP during a pre-set period of time.

* * * * *